INVENTOR.
KENNETH R. HACKETT
BY R. P. Campbell
ATTORNEY

INVENTOR.
KENNETH R. HACKETT
BY R.P. Campbell
ATTORNEY

March 5, 1968 K. R. HACKETT 3,372,237

MULTIPLEX COMMUNICATION SYSTEM WHEREIN A REDUNDANT BIT OF ONE SIGNAL IS REPLACED BY A BIT OF ANOTHER SIGNAL

Filed Sept. 18, 1963 7 Sheets-Sheet 3

INVENTOR.
KENNETH R. HACKETT

BY [signature]

ATTORNEY

March 5, 1968 K. R. HACKETT 3,372,237
MULTIPLEX COMMUNICATION SYSTEM WHEREIN A REDUNDANT BIT OF ONE SIGNAL IS REPLACED BY A BIT OF ANOTHER SIGNAL
Filed Sept. 18, 1963 7 Sheets-Sheet 4

INVENTOR.
KENNETH R. HACKETT
BY R. P. Campbell
ATTORNEY

INVENTOR.
KENNETH R. HACKETT
BY R. P. Campbell
ATTORNEY

INVENTOR.
KENNETH R. HACKETT
BY R. P. Campbell
ATTORNEY

INVENTOR.
KENNETH R. HACKETT
BY R. P. Campbell
ATTORNEY

United States Patent Office 3,372,237
Patented Mar. 5, 1968

3,372,237

MULTIPLEX COMMUNICATION SYSTEM WHEREIN A REDUNDANT BIT OF ONE SIGNAL IS REPLACED BY A BIT OF ANOTHER SIGNAL

Kenneth R. Hackett, Boulder, Colo., assignor to Ball Brothers Research Corporation, Boulder, Colo., a corporation of Colorado Filed Sept. 18, 1963, Ser. No. 309,788
10 Claims. (Cl. 179—15)

This invention relates to digital communication systems and more particularly to digital television systems employing delta modulation.

It is known that communication in the digital mode offers the possibility of secret transmission of information; that is, transmission of information in such a form that, although the information signals might be intercepted during transmission, the information itself could never be understood without the precise processing apparatus. Although this has been possible to a very limited extent with techniques performed upon analog signals, the degree of processing or scrambling which is possible, is far greater with information in the digital form. In this form, the pulses can be manipulated so that it is virtually impossible to unscramble or reprocess the signal and receive the information without the exact unscrambling or processing apparatus.

There are several types of digital systems which have been employed. The most common system previously employed has been of the pulse code modulation type, wherein the information is carried by code groups, each group consisting of a fixed number of pulses which number depends upon the number of levels of quantization desired in the case of television. These systems are unsatisfactory for a number of reasons. It is known that the bit rates required to accurately represent a picture in a digital form are very high. In situations where very high resolution is desired to portray fine detail, the use of pulse code modulation techniques becomes cumbersome and unusable in certain systems due to present speed and accuracy limitations of particular circuit elements. It can well be appreciated that an ideal system would incorporate modulation techniques which would furnish equivalent signal information and detail at a fraction of the bit rate.

A form of modulation known as delta modulation, which is a particularized digital form for conveying electrical information, has been known and used in previous digital systems obtaining some advantages, but grossly ignoring some real benefits which it offers. Delta modulation provides for the transmission of pulses indicating the change in an analog signal at designated sampling intervals. Generally, the signals are transmitted in the form of a binary code represented by a pulse or no pulse condition. However, it can readily be appreciated that the conversion of an analog signal into the digital form by delta modulation techniques is a very difficult function to perform without error; previous attempts to accomplish this operation have resulted in systems operating at very low bit rates. Any attempts to increase the bit rate so as to furnish an output signal containing very fine detail and capable of very high resolution have been fruitless primarily because of the creation of intolerable error during the conversion process. This has been normally caused by a breakdown of circuitry and an inability to properly handle and manipulate these relatively high bit rate signals to prepare them for ultimate transmission and use.

In many types of communications, it is often desirable to transmit several signals, each representative of distinct types of information, on one carrier wave. In such systems, it is customary to multiplex or interleave in time the information contained on the several signals. Normally, this has been accomplished by utilizing certain portions of one of the signals in which information forming a known waveform regularly occurs at periodic intervals. Thus, in theory at least, the information quality of the signal will not be tampered with or destroyed in any way by the insertion or superimposition of information pulses from a second signal upon the first signal during these periodic intervals. For example, if timing signals or sound signals are desired to be carried on an analog video signal, normally the timing pulses or periodic sample pulses of the sound signal are superimposed upon the portion of the analog video signal which is of a predictable amplitude, shape, or time relation, such as that portion of the signal representing the fly-back or retrace time.

In the field of digital communications, where video signals are comprised of information pulses having a very high bit rate such as 20 megabits, the insertion or superimposition of such audio and/or timing information on the signal during the fly-back time is extremely difficult due to the extremely short time duration of each pulse. In addition, since the picture information is carried in the form of discrete pulses representing factors such as particular levels of brightness, any interference with one of these pulses will result in error being created in the picture thus deteriorating or destroying the final image.

Accordingly, it is an important object of this invention to provide an improved digital communication system employing delta modulation for converting analog information into digital form, transmitting it to a remote point and reconverting it into its original analog form.

It is an additional object of the invention to provide a communication system of the type described into which digital processing and reprocessing equipment can be inserted in order to insure absolute secrecy during transmission.

It is an additional object of the invention to provide a system for combining two digital pulse trains into one digital pulse train by time division multiplex for transmission over a single communication link, as well as a system for separating the two digital trains after transmission.

It is a further object of this invention to provide a means for performing the above without the creation of any material error in the resulting multiplex signal and with relatively simple and reliable circuitry.

Stated in general terms, the objects of the invention are attained by converting a first relatively high frequency analog signal into a digital form by delta modulation techniques. A second relatively low frequency analog signal is likewise converted into digital form by delta modulation techniques, and, by means of the multiplexing system of the present invention, the pulses of this second relatively low bit rate digital signal are multiplexed together with the pulses of the first relatively high bit rate signal.

Basically, this is accomplished by switching the first digital signal with the first digital signal delayed one-half of a bit at fixed intervals so that an output signal is formed having several relatively shorter bits along with a regular bit which is redundant in that it represents information already shown by one of the shorter bits. This redundant bit is then replaced by one bit from the second signal and the resulting waveform or pulse train is retimed by pulses having a slightly higher bit rate than any of the other two previous signals so that each bit, short or long will be sampled. It is also important that a pattern be contained on the second signal which can be recognized on the multiplexed signal at the opposite end of the system. This multiplexed digital signal is then in a form which can be processed and transmitted. At the receiver, the multiplexed signal is retimed and reprocessed by a process which is the counterpart of the process at the transmission end. The original multiplexed digital signal is now retimed and divided by a demultiplexer into the first digital signal and the second digital signal.

This is accomplished by sampling the multiplexed digital signal and examining each successive bit to see if it comprises a part of the synchronizing pattern which indicates the relative position of the second signal pulses upon the multiplexed signal. When the pattern is recognized, the second signal pulses are sampled and gated off and the first signal pulses remaining are then retimed to remove the spaces created above. Each of these signals is now transformed into its respective analog form by means of separate digital-to-analog converters.

A more detailed description of a specific embodiment of the invention is given below with reference to the accompanying drawings, wherein.

Figure 4:
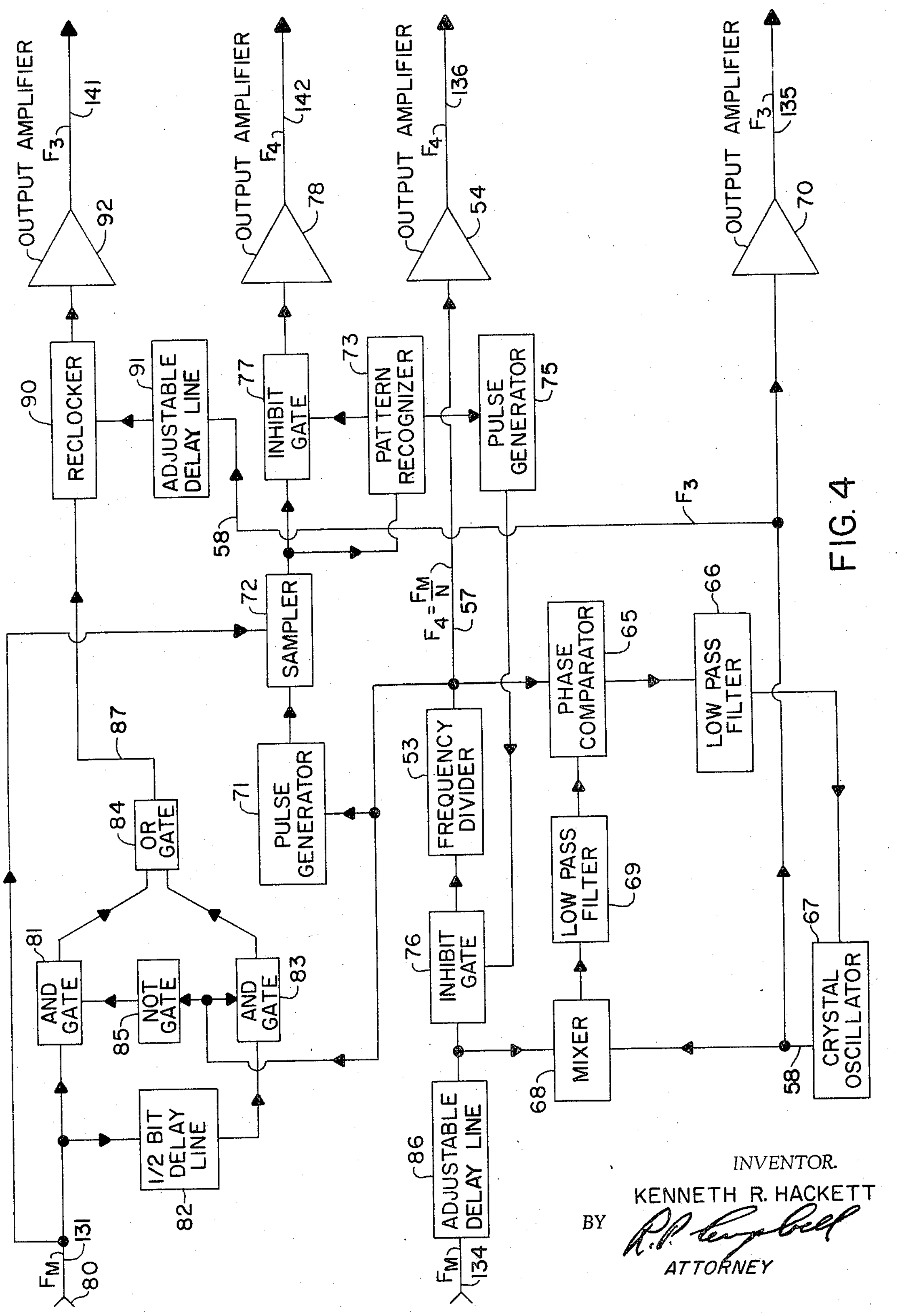
Figures 6, 7:
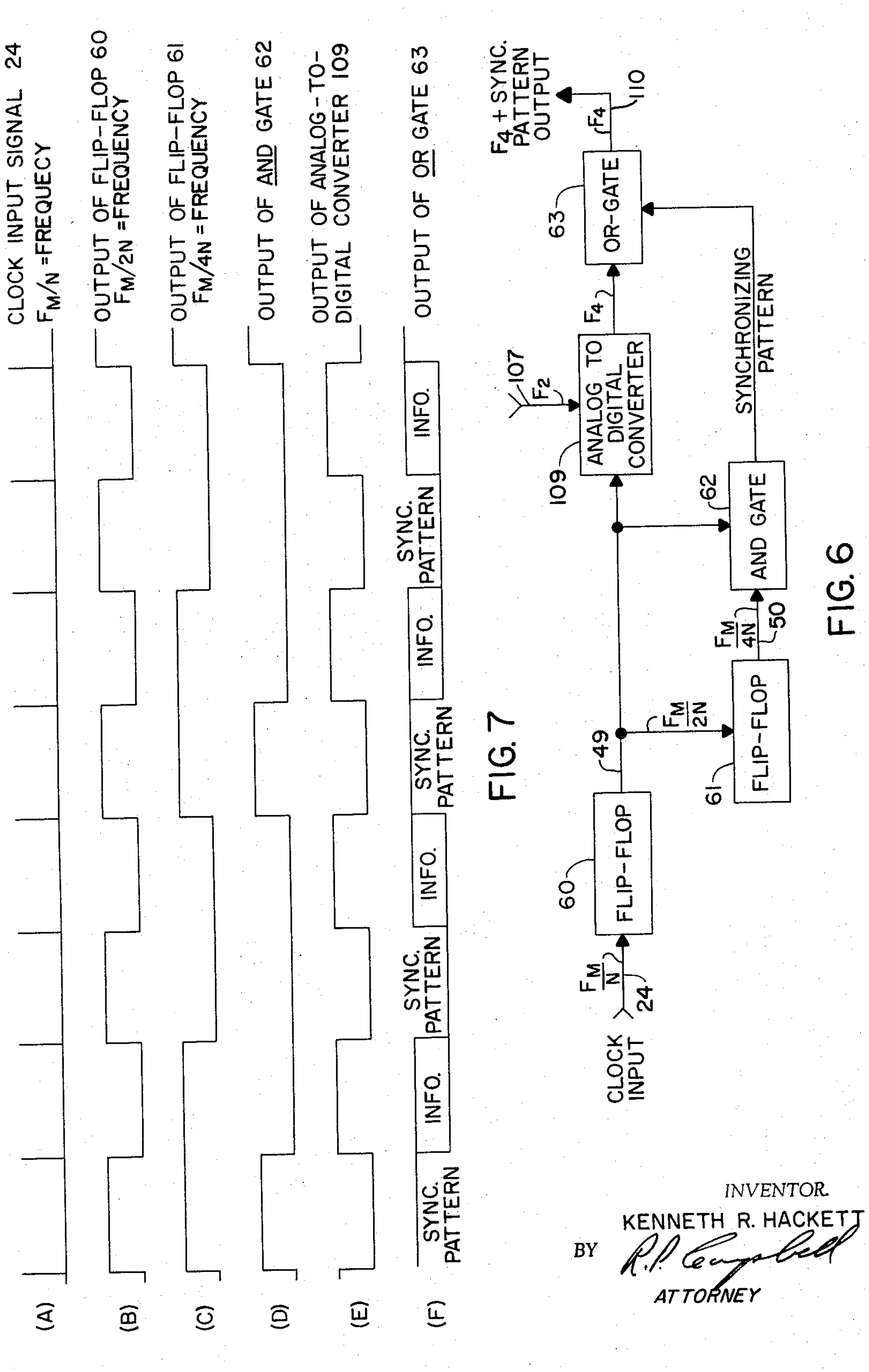
Figure 8:
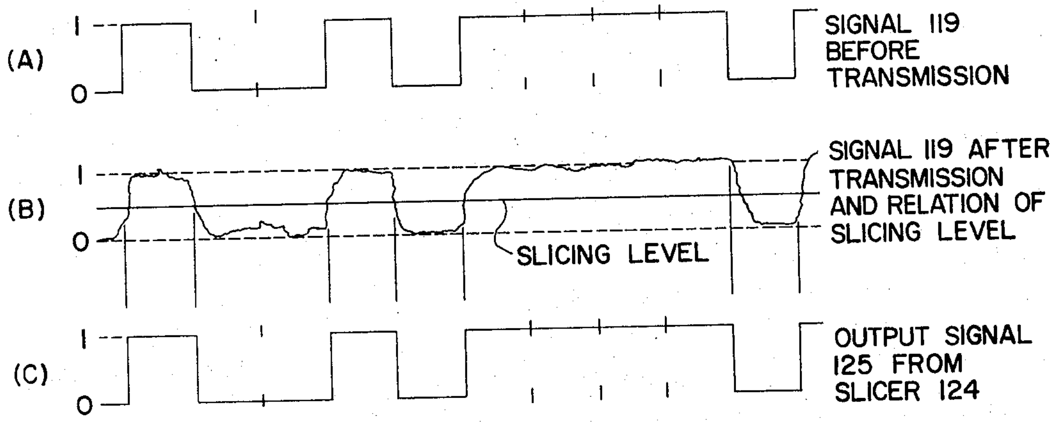
Figure 9:
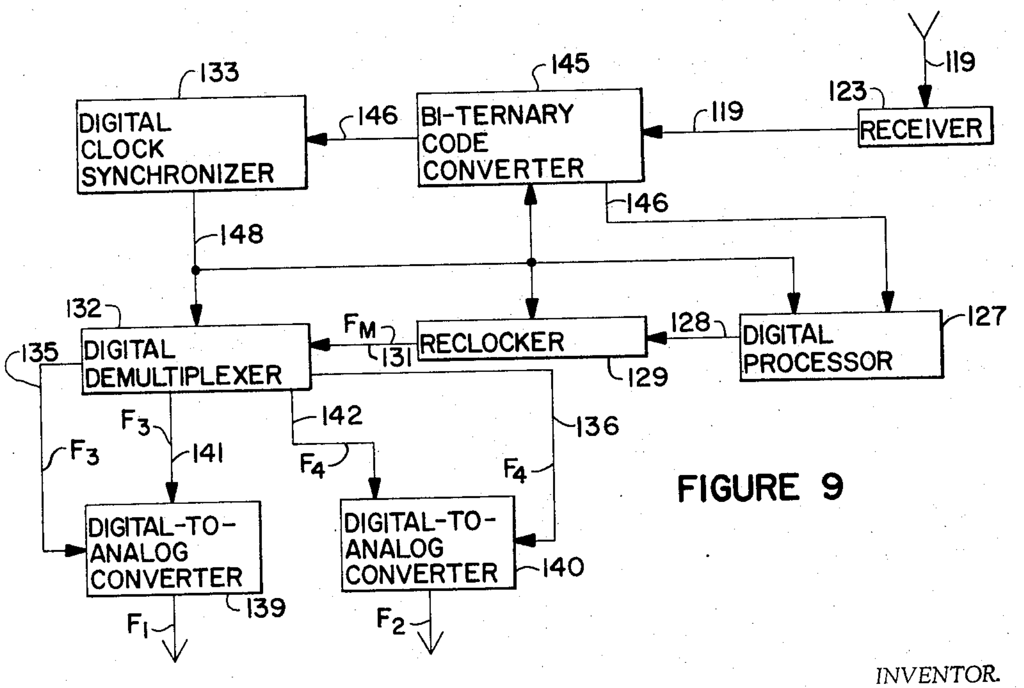

FIGURES 3(A) to 3(H) are schematic waveform diagrams illustrating a multiplexing method of the present invention;

FIGURE 4 is a block diagram of a demultiplexer of the present invention;

FIGURES 5(A) to 5(G) are schematic waveform diagrams illustataing the demultiplexing method of the present invention;

FIGURE 6 is a block diagram showing a method by which one type of synchronizing pattern may be inserted into one of the digital signals;

FIGURES 7(A) to 7(F) are schematic waveform diagrams illustrating the method shown in FIGURE 6;

FIGURES 8(A) to 8(C) are schematic waveform diagrams illustrating the function of the slicer 124; and FIGURE 9 is a portion of the receiver terminal embodying a code converter in place of the slicer 124 and the reclocker 126 shown in FIGURE 1.

Figure 1A:
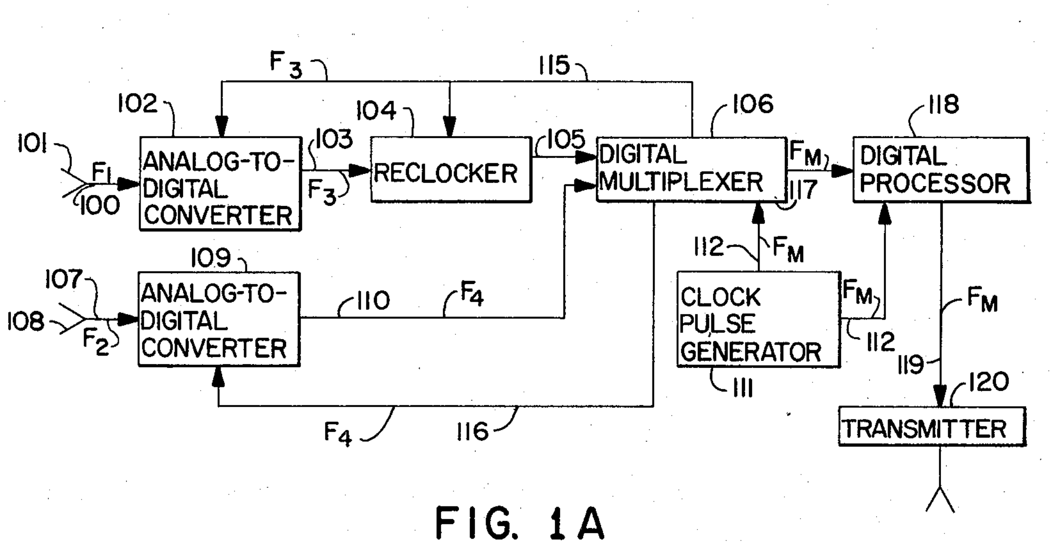
FIGURE 1(A) is a block diagram of the transmitting portion of a communication system embodying the present invention.

In the block diagram of FIGURE 1(A), a first relatively high frequency ($F_1$) analog signal 100 is fed to an input 101 connected to an analog-to-digital converter 102. A preferred embodiment of the analog-to-digital converter is substantialy as shown, described, and claimed in U.S. patent application, Ser. No. 266,283, entitled, "High Speed Analog-to-Digital Converter," by inventor Kenneth R. Hackett, filed on Mar. 19, 1963, now U.S. Patent Number 3,273,141, issued Sept. 16, 1966. It should be understood that any one of a number of analog-to-digital converters might be employed such as the one shown in U.S. Patent 2,916,553, entitled, "Hight Speed Delta Modulation Encoder," by inventor T. H. Crowley, filed May 31, 1957. The digital output signal 103 of converter 102, having a frequency $F_3$ equal to its bit rate, is retimed and reshaped by a reclocker 104, the preferred embodiment of which is substantially as shown, described, and claimed in the U.S. patent application entitled, "Reclocking System," by Kenneth R. Hackett, being filed concurrently herewith, now U.S. Patent Number 3,270,288, issued Aug. 30, 1966. It should be understood that there are a great many reclockers available which would perform substantially the same task, some of which would operate at the high speeds required for this application. The retimed digital output signal 105 is fed into a digital multiplexer 106, a complete description of which follows in this specification.

A second relatively low frequency ($F_2$) analog signal 107 is fed to an input 108 conected to an analog-to-digital converter 109, constructed substantially as analog-to-digital converter 102 described above. The digital output signal 110 of analog-to-digital converter 109 having a frequency $F_4$ equal to its bit rate is fed directly into the digital multiplexer 106. A clock pulse generator 111 is connected to digital multiplexer 106 and furnishes a signal 112 having a fixed frequency, designated as $F_M$.

The clock pulse generator 111 comprises a standard crystal oscillator connected to an output amplifier which produces a signal having sufficient amplitude to drive other circuitry in accordance with precise timing information furnished by the clock signal 112. It is noted that there are many other known types of clock pulse generators capable of performing the same function within the system which are well known to those skilled in the art.

Digital multiplexer 106 generates two clock signals 115 and 116 having respective frequencies of $F_3$ and $F_4$, the clock signal 115 having a frequency $F_3$ being fed back into analog-to-digital converter 102 and reclocker 104 to drive them, and the clock signal 116 having a frequency $F_4$ being fed back to drive analog-to-digital converter 109. The output signal 117 of digital multiplexer 106, having a frequency of $F_M$ equal to $F_3+F_4$ and containing, in digital form, the information from both the first and second signals, 100 and 107 respectively, is fed into a digital processor 118.

The digital processor 118 may consist of a computer or similar device capable of manipulating digital information in a binary form, which manipulations can be recalled and reversed at a later time and at a remote station by similar logic equipment. The output of the digital processor 118 is a digital signal 119 containing all the information which appeared on the multiplexed signal but in a modified form or code which can only be translated by properly corresponding equipment. The processed signal 119 is fed to a transmitter 120 where it is conveyed to a receiver 123 located at a station remote from the transmitter 120. Although many types of transmitters and receivers may be used which are well understood by those skilled in the art, the preferred embodiment employs a Raytheon Television Microwave Relay, Model KTR-1000G. This microwave relay is manufactured by Raytheon Company, Waltham 54, Mass., and complete construction details, circuit diagrams, and instructions for its use are contained in the "Instruction Manual for Raytheon Television Microwave Relay," published for this equipment.

The receiver 123 receives and feeds the incoming digital signal 119 to a slicer 124 which defines a slicing level which is a signal level intermediate the extremities of the pulse amplitudes contained on the incoming digital signal 119. Since the incoming signal 119 contains much noise and jitter and this tends to obscure the individual pulses, it is important that a means be provided to accurately determine the binary state of each discrete pulse contained on the incoming signal 119; that is, whether it is a one value or a zero value, representing a pulse or no pulse, respectively. This function is performed by the slicer 124 which measures each pulse and determines whether its amplitude is above or below the slicing level, thus, clarifying the distorted information on the incoming signal. Waveforms illustrating the action of slicer 124 are shown in FIGURE 8, (A), (B), and (C). These waveforms are generated by slicing circuitry well-known to those skilled in the art.

The output signal 125 of slicer 124 is fed to a reclocker 126 which is substantially identical to the reclocker 104 above. The signal 125 is retimed and reshaped by reclocker 126 and fed into a digital processor 127. The digital processor is the counterpart of the previously described digital processor 118 used to manipulate the individual pulses of the digital signal. The output signal 128 of digital processor 127 is the original multiplexed digital signal 117 containing both the first and second digital signals multiplexed together. This signal 128 is fed to another reclocker 129, which is substantially identical to the reclocker 104 above, where it is retimed and reshaped. The reclocker output signal 131 from reclocker 129 is fed to a digital demultiplexer 132, a complete description of which follows in this specification.

The output signal 125 of slicer 124 is also fed into a digital clock synchronizer 133 the function of which is to produce a clock signal 134 which is accurately timed with clocking information in the incoming transmitted signal 119. The preferred embodiment of the digital clock synchronizer is substantially as shown, described, and claimed in U.S. patent application entitled, "Clock Synchronizer," by inventor Kenneth R. Hackett, now U.S. Patent No. 3,308,378, issued Mar. 7, 1967. It should be understood that other types of circuitry could serve the same synchronizing function such as a simple phase lock loop, the construction and operation of which is well understood to those skilled in the art. This synchronizing or clocking signal 134 is used to drive reclocker 126, digital processor 127, reclocker 129, and the digital demultiplexer 132. The digital demultiplexer 132 generates two clock signals 135 and 136 having frequencies $F_3$ and $F_4$, respectively. The clock signal 135, having a frequency $F_3$, is fed to and serves to drive a digital-to-analog converter 139, and the clock signal 136, having a frequency $F_4$, is fed to and serves to drive a digital-to-analog converter 140. The digital demultiplexer 132 processes the incoming multiplexed digital signal 131 and produces a first relatively high frequency ($F_3$) digital signal 141 and a second relatively low frequency ($F_4$) digital signal 142. Signal 141 is fed to digital-to-analog converter 139 where it is transformed into its original analog state, and signal 142 is fed to digital-to-analog converter 140 where it is transformed into its original analog state.

The function performed by the slicer 124 and the reclocker 126 preferably is carried out, in certain instances, by a code converter, such as the type commonly referred to as a bi-ternary code converter. Thus, when a narrow-band microwave link is used to transmit the signal information from the transmitter to the receiver, it may be preferable to employ code conversion techniques prior to transmission to reduce the apparent bandwidth of the signal. The term "narrow-band" as used here means narrow relative to the normal bandwidth requirement for the transmission of video information in binary form. The bandwidth must still be appreciable even to carry information in bi-ternary form. The integration of this equipment into the receiving end of the system shown in FIGURE 1(B) can be made in the manner shown in FIGURE 9, wherein the pertinent portion of the receiving terminal equipment is shown. Slicer 124 and reclocker 126 are replaced by a bi-ternary code converter 145.

Thus, a bi-ternary code converter 145 is connected directly to, and receives signal 119 from, receiver 123. The output signal 146 of bi-ternary code converter 145 is fed into digital demultiplexer 132 after passing through digital processor 127 and reclocker 129. Digital clock synchronizer 133 also is connected to bi-ternary code converter 145 and receives signal 146 therefrom, producing a clock signal 148 which is accurately timed with clocking information in the incoming transmitted signal 119. This synchronizing or clocking signal 148 is fed to and used to drive the bi-ternary code converter 145, the digital processor 127, the reclocker 129, and the digital demultiplexer 132.

Figure 2:
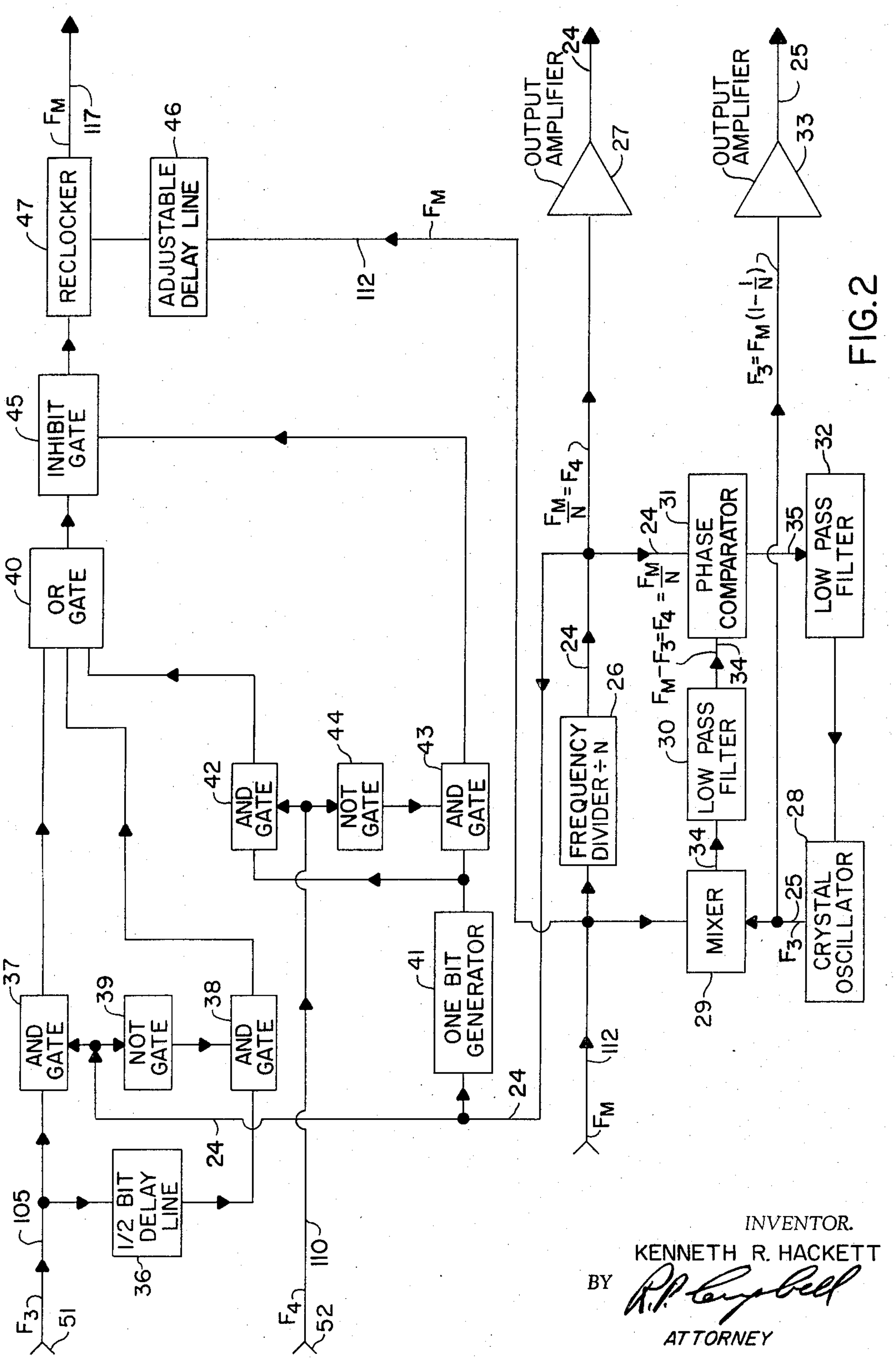
FIGURE 2 is a block diagram of a multiplexer of the present invention.
Figure 3:
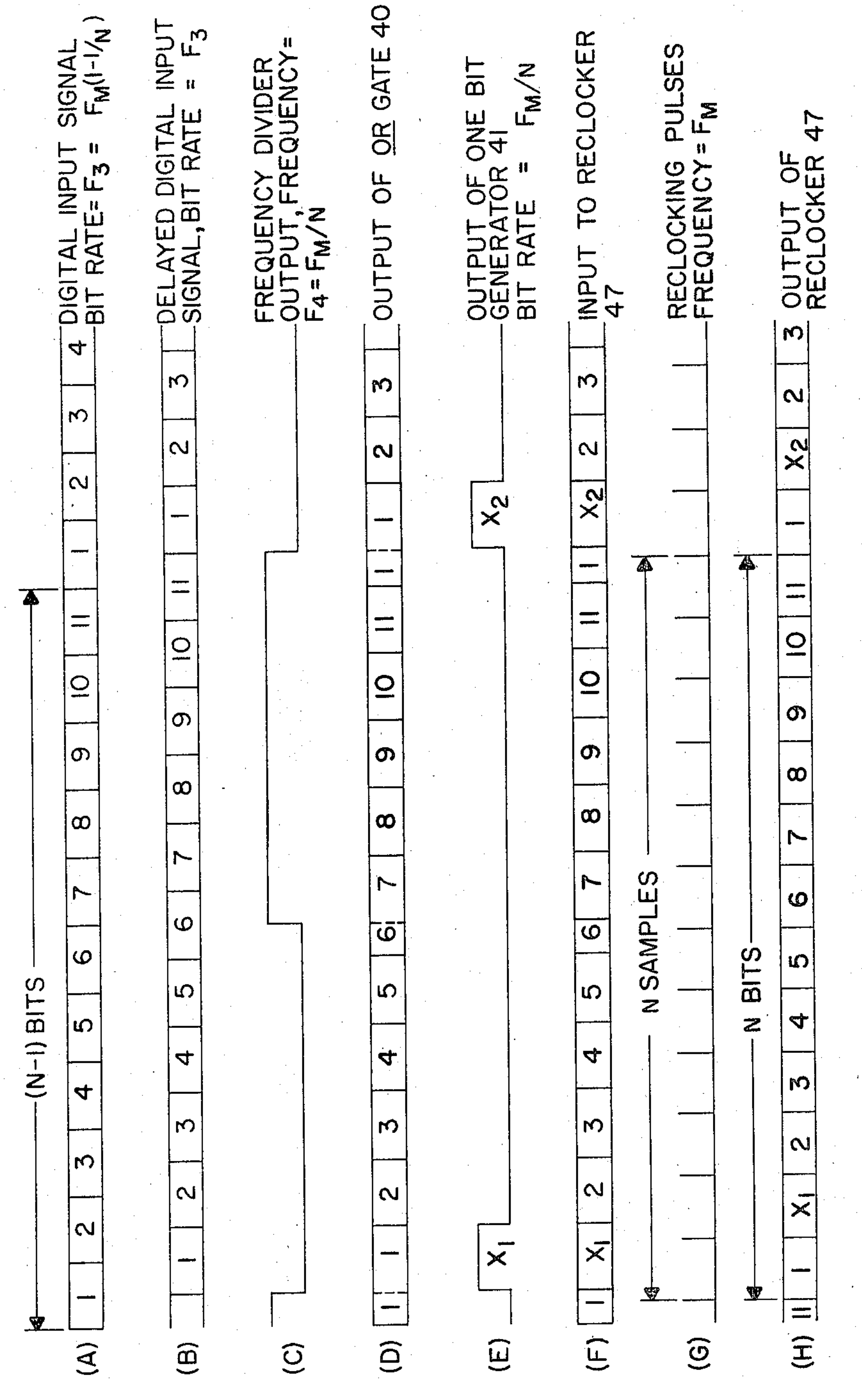

The preferred embodiment of a digital multiplexer 106 is shown in block diagram form in FIGURE 2. The incoming clock signal 112 from the clock pulse generator 111, having a frequency $F_M$ equal to the bit rate of the multiplexed signal 117, drives a frequency divider 26, which results in a signal 24 having a frequency $F_4$ equal to $F_M/N$, where N represents the number of bits per interval on the multiplexed signal, as shown in FIGURE 3(H). This signal 24 is amplified by an output amplifier 27 and is fed back to drive analog-to-digital converter 109 which converts the low frequency analog signal into digital form.

A crystal-controlled voltage-variable oscillator 28, having a frequency $F_3$, generates a signal 25 which is beat with the incoming clock signal 112 having a frequency $F_M$ in a mixer 29. Mixer 29 produces a signal 34 which, when filtered by low pass filter 30, has a frequency equal to the difference between $F_M$ and $F_3$. Since the sum of $F_3+F_4$ equals $F_M$, then $F_M-F_3$ equals $F_4$, or $F_M/N$. Phase comparator 31 serves to compare the phase of the output signal 24 of frequency divider 26 with the phase of the signal 34 from the filter 30 and results in an output signal 35. The amplitude of signal 35 is proportional to the phase difference between the two input signals, 24 and 34. This signal 35 is fed back to the oscillator 28 through low pass filter 32 to control its frequency. The feedback is degenerative so the signals from low pass filter 30 and frequency divider 26 are locked in phase. Under these conditions, $F_3+F_4$ exactly equals $F_M$. The clock signal $F_3$ passes through output amplifier 33 and is coupled to the analog-to-digital converter 102 which converts the high frequency analog signal into digital form.

Since the two analog-to-digital converters 102 and 109 (shown in FIGURE 1(A)) are each separately driven by clock signals 115 and 116 from the digital multiplexer 106 having frequencies $F_3$ and $F_4$ respectively, the resulting converted digital signals 103 and 110 emitted by each converter have frequencies $F_3$ and $F_4$ equal to their respective bit rates. The converted and retimed digital signal 105 having a relatively high frequency $F_3$ enters the digital multiplexer 106 at input 51 (shown in FIGURE 2), and is coupled into a delay line 36 which delays the pulse train one-half of a bit. The signal 105 is fed to AND gate 37 and the delayed signal 105 is fed to AND gate 38. The output from the frequency divider 26 is used to gate either the signal 105 through AND gate 37 or delayed signal 105 through AND gate 38 by means of NOT gate 39 in the following manner.

Thus, when the signal 24 from frequency divider 26 is in its ONE value state, it gates signal 105 through AND gate 37. In this instance, since NOT gate 39 serves to invert the state of an impressed signal, a ZERO value is registered at AND gate 38 and no pulse is passed. When the signal 24 from frequency divider 26 is in its ZERO state, the NOT gate 39 registers a ONE value which gates pulses from the delayed signal 105 through AND gate 38. The signal 105, the delayed signal 105, and the signal 24 from frequency divider 26 can be seen more clearly with reference to FIGURES 3(A), 3(B) and 3(C). The signals from AND gates 37 and 38 are combined in OR gate 40 resulting in the signal shown in FIGURE 3(D).

In order to demultiplex the subsequently multiplexed signal, a synchronizing pattern is inserted into the relatively low frequency ($F_4$) signal 110 after it is emitted from analog-to-digital converter 109 (shown in FIGURE 1(A)) in digital form. This relatively low frequency ($F_4$) signal 110 containing the synchronizing pattern is then multiplexed with the relatively high frequency ($F_3$) signal 105, according to the system of the present invention, and the pulses comprising the synchronizing pattern provide a series of fixed reference points so that, in the demultiplexer, the location of the synchronizing pattern and, correspondingly, the pulses comprising the relatively low frequency ($F_4$) signal can be detected, allowing the latter signal to be gated off. The pulses of the lower frequency digital signal, at least a portion of which comprises the synchronizing pattern, occur at periodically spaced intervals on the multiplexed digital signal but are separated by a fixed number of pulses from the first digital signal.

It should be clearly understood that there are many types of patterns which may be employed and many methods of inserting these patterns, as well as many points in the circuit at which a pattern may be inserted. The method illustrated is merely one method of inserting a pattern in a relatively simple manner. Thus, the output signal 24 from output amplifier 27 (shown in FIGURE 2) having a frequency equal to $F_M/N$ is fed to a flip-flop circuit 60 (as shown in FIGURE 6) which produces a signal 49 having a frequency $F_M/2N$; this signal 49 serves to drive analog-to-digital converter 109 (as shown in FIGURE 6) corresponding to analog-to-digital converter 109 in FIGURE 1(A). This signal 49 also is coupled to a flip-flop circuit 61 (as shown in FIGURE 6) which again divides the frequency by two. The output signal 50 of flip-flop circuit 61 having a frequency $F_M/4N$, is fed to AND gate 62 along with the output 49 from flip-flop circuit 60.

Waveforms of the signal 24 from output amplifier 27, the output signal 49 of flip-flop circuit 60, and the output signal 50 of flip-flop circuit 61, are diagrammatically shown in FIGURES 7(A), 7(B) and 7(C). Thus, it can be seen that when the waveforms of FIGURE 7(B) and FIGURE 7(C) are combined in AND gate 62, the synchronizing pattern shown by the waveform of FIGURE 7(D) will result as the output signal of AND gate 62.

The analog signal 107 having a frequency $F_2$ (shown in FIGURE 1(A)), is fed to analog-to-digital converter 109 as shown in FIGURE 6 and is converted into a digital signal having a frequency equal to $F_4$, the waveform of which is diagrammatically shown by FIGURE 7(E). This signal is fed to OR gate 63 along with the synchronizing pattern from AND gate 62, and the output of OR gate 63 is the digital signal 110 containing both the synchronizing information and the analog signal information (as shown by the waveform diagram of FIGURE 7(F)).

The negative going edge of the signal 24 from the frequency divider 26 triggers a one bit generator 41 as shown in the waveform diagrams of FIGURES 3(C) and 3(E). The relatively low bit rate signal 110 from OR gate 63 (shown in FIGURE 6), having a frequency equal to $F_4$ and containing both information and synchronizing pattern pulses, enters the digital multiplexer 106 (shown in FIGURE 1(A)) at input 52 (shown in FIGURE 2) and is used to gate a signal from the one bit generator 41 through AND gate 42 and AND gate 43 by means of NOT gate 44 in a manner similar to that described hereinabove with respect to signal 105 having a frequency $F_3$.

Thus, when a signal 110 having a frequency $F_4$ is in its ZERO state, AND gate 43 conducts a pulse which is fed to INHIBIT gate 45 which inhibits the output of OR gate 40. However, if signal 110 of frequency $F_4$ is a ONE value, a pulse is conducted through AND gate 42 and combined with the other digital pulse train in OR gate 40. By this process, the redundant or extra bit in the pulse train shown in FIGURE 3(D) is replaced by a bit designated X from the pulse train of frequency $F_4$ as shown in FIGURE 3(F). Thus, the signal of frequency $F_4$ has been added to the signal of frequency $F_3$ in the space created so that every bit in the waveform 3(F) is shown only once.

All gating has occurred at a frequency equal to $F_M/N$, where N represents the number of bits in the output signal 117 from digital multiplexer 106 having a frequency equal to $F_M$. Since the pulse train shown in FIGURE 3(F) is sampled by sampling pulses such as those shown in FIGURE 3(G) having a frequency equal to $F_M$, which is greater than the frequency $F_3$, during every N bit, one bit in the waveform (shown in FIGURE 3(F)) is sampled once. Adjustable delay line 46 (shown in FIGURE 2) receives a signal 112 having a frequency $F_M$ from the clock pulse generator 111 (as shown in FIGURE 1(A)) and is adjusted so that the pulses fed to the reclocker 47 have the timing and spacing relationship with the signal from OR gate 40 which is shown in FIGURES 3(F) and 3(G). The resulting output signal 117 from reclocker 47 is a retimed digital signal having a frequency equal to $F_M$ and containing both digital pulse trains having frequencies $F_3$ and $F_4$ respectively, as shown in FIGURE 3(H).

If reclocker 47 only sampled the undelayed input signal of frequency $F_3$ continuously, the transition between the individual pulses on the waveform (shown in FIGURE 3(F)) would be sampled periodically since the frequency $F_3$ of the incoming signal is less than the sampling or reclocking frequency $F_M$. This would result in the generation of errors since the individual pulses are very hard to distinguish at the transition periods due to noise and distortion normally picked up during signal manipulation. Therefore, in order to inhibit the reclocker 47 from sampling the transitions between the pulses in signal 105, the signal 105 is delayed for one-half of a bit at the outset. Then the delayed signal 105 and the original signal 105 are alternately switched into OR gate 40 and subsequently into reclocker 47 by means of the signal 24 from the frequency divider 26 having a frequency equal to $F_M/N$. In this manner, only the middle portion of the pulses in the waveform (shown in FIGURE 3(F)) is sampled by the sample pulses shown in FIGURE 3(G).

Figure 5:
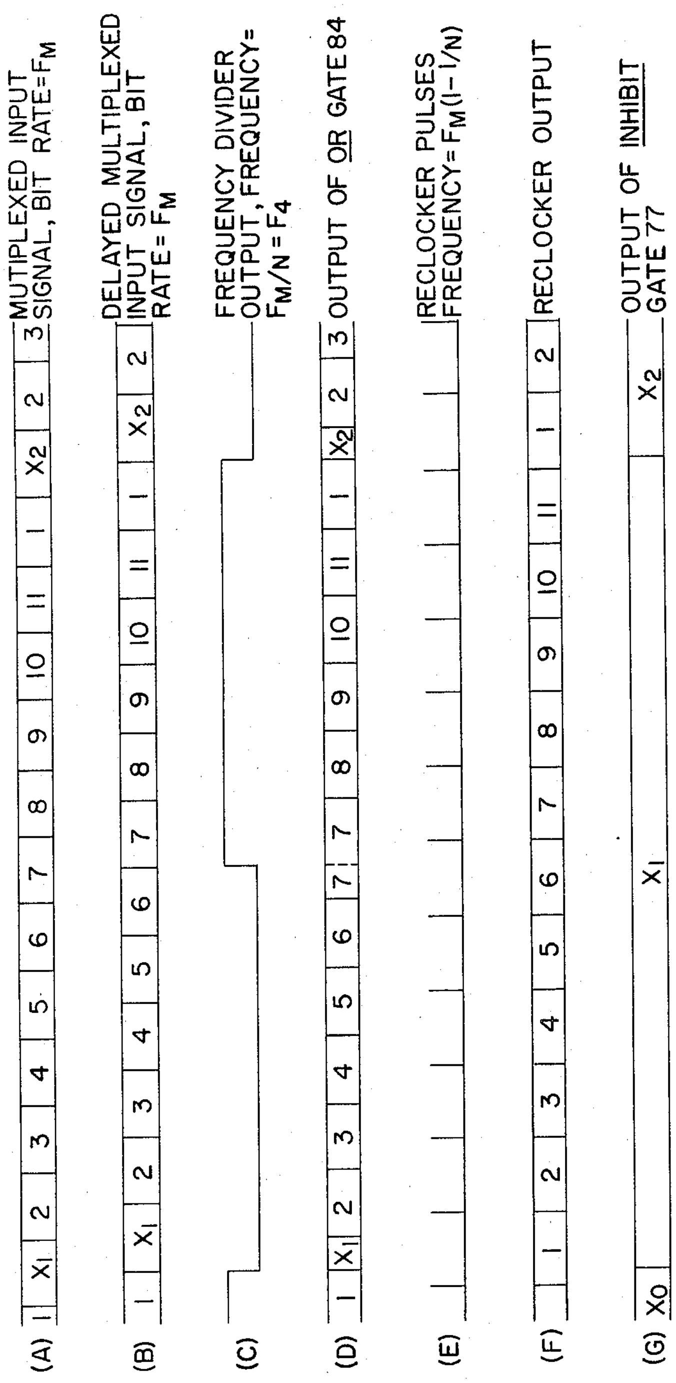

The operation of the digital demultiplexer 132 (shown in FIGURE 1(B)) is explained below with reference to FIGURES 4 and 5. Basically, the demultiplexing process is the reverse of the multiplexing process and results in a separation of the two signals 105 and 110. In the digital multiplexer 106, spaces were created periodically in one signal 105 which had a frequency $F_3$ and pulses from a second digital signal 110 having a frequency $F_4$ were inserted in these spaces. In the digital demultiplexer 132, pulses from the relatively low frequency digital signal 110 and the spaces which they occupied are removed from the multiplexed signal 131 and processed to yield the separate digital signal 110. The remaining pulses are retimed to form the signal 105.

Thus, portions of the multiplexed signal 131 are gated interchangeably with a one-half bit delayed multiplexed signal 131 to form a signal which contains pulses representative of each pulse of the multiplexed signal 131 but in which the pulses comprising the relatively low bit rate signal 110 occupy a substantially smaller time interval. This signal is sampled at a frequency $F_3$ equal to the frequency of the relatively high bit rate signal 105 which is lower than the frequency $F_M$ of the multiplexed signal. By properly timing the sampling pulses, the discrete pulses (X) of the second signal 110 will not be sampled and the resulting signal will be the digital signal 105.

Figure 1B:
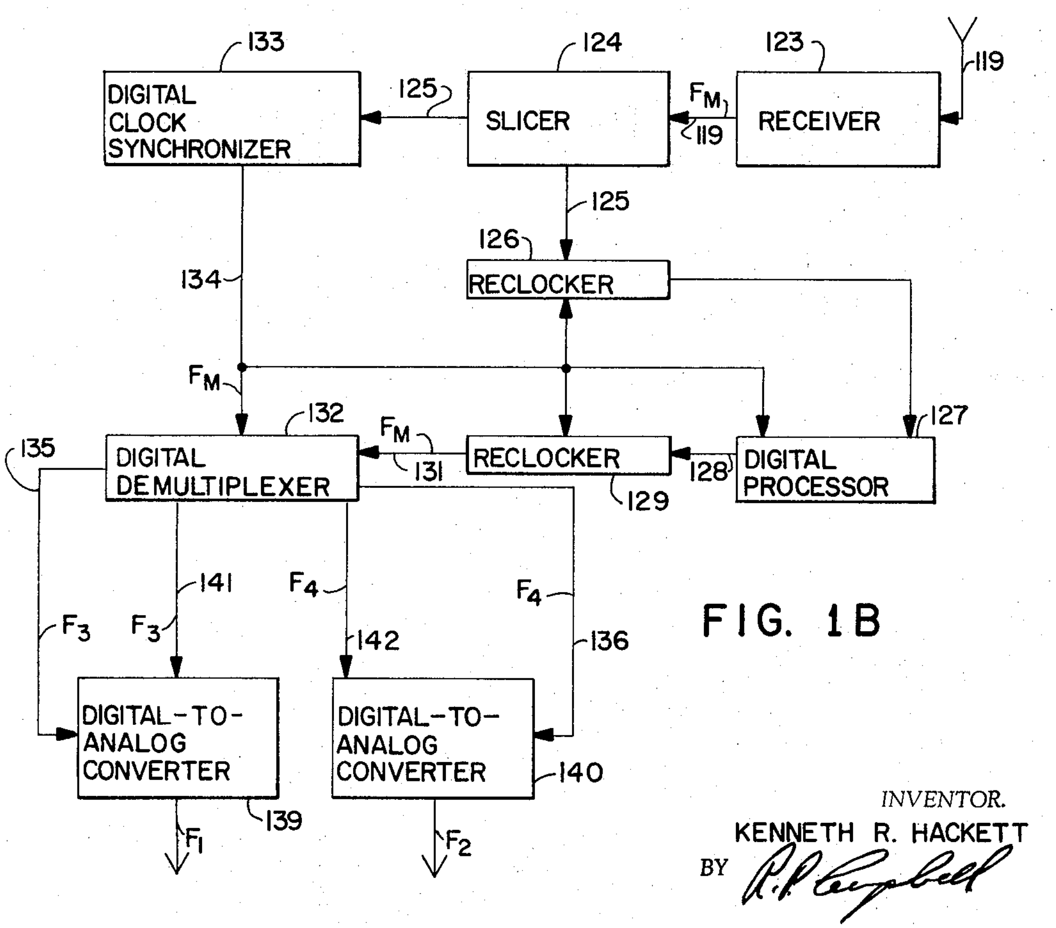
FIGURE 1(B) is a block diagram of the receiving portion of a communication system embodying the present invention.

Two clock signals 135 and 136 having frequencies $F_3$ and $F_4$, respectively, are generated in digital demultiplexer 132 from the clock input signal 134 having a frequency $F_M'$ equal to $F_M$ emitted by the digital clock synchronizer 133 (shown in FIGURE 1(B)) in the same manner as accomplished in the multiplexer 106. That is, the incoming clock signal 134 from digital clock synchronizer 133 having a frequency $F_M'$ drives a frequency divider 53 (shown in FIGURE 4) which produces a signal 57 having a frequency $F_4$ equal to $F_M/N$. As before, this signal 57 is amplified by output amplifier 54 and serves to drive digital-to-analog converter 140 (shown in FIGURE 1(B)) which converts the low bit rate digital signal 142 into analog form.

Also, a standard phase lock comprising phase comparator 65 and low pass filter 66 is used to control the frequency of a voltage-variable crystal oscillator 67. The output signal 58 of oscillator 67 is beat with the incoming clock signal having a frequency $F_M$ in the mixer 68. The resulting signal is filtered by low pass filter 69 and fed to phase comparator 65. The signal 58 having a frequency $F_3$ is coupled out of voltage-variable crystal oscillator 67, amplified by output amplifier 70 and fed as signal 135 to digital-to-analog converter 139 (shown in FIGURE 1(B)) to drive it as it converts the high bit rate digital signal 141 into analog form.

The initial function of the digital demultiplexer 132 is to search for and recognize a pattern of pulses indicative of the position of each bit from the relatively low bit rate digital signal 110, which bit is separated within the multiplexed digital signal by a plurality of bits from the relatively high bit rate digital signal 105. The negative-going edge of the signal 57 from frequency divider 53 triggers a pulse generator 71. The output of the pulse generator 71 is fed to a sampler 72 which is also coupled to the multiplexed digital signal 131 and samples one bit from said signal. The sampled bit is fed to a pattern recognizer 73 which examines successive sampled bits to see if the desired pattern occupies these time spaces.

The sampled bit does not necessarily constitute a part of the synchronizing pattern but could be any one of the information pulses contained on incoming signal 131. Assuming that normally on the first attempt the sampled bit would not be part of the synchronizing pattern, the pattern recognizer 73 triggers the pulse generator 75 which generates a signal in INHIBIT gate 76 to prevent one pulse from entering the frequency divider 53. This causes the frequency divider to skip a count; that is, its output is retarded by one bit so that the sampler 72 gates several bits into the pattern recognizer 73 during the time the output was retarded. The operation of the pattern recognizer 73 and the associated circuits is similar to a stepping process with respect to the frequency divider and continues until the pattern is located. When the pattern is located, the pattern recognizer 73 no longer striggers pulse generator 75 and therefore the frequency divider 53 is no longer stepped. This means that the time interval in which the synchronizing pattern alternately appears with the second signal is continuously sampled. Therefore, the pattern recognizer supplies pulses to INHIBIT gate 77 which inhibits the passage of pulses from sampler 72 during the synchronizing pulse time interval. This effectively erases the synchronizing pulses from the second signal, and only the second signal information pulses are left. This is illustrated by the waveform of FIGURE 5(G). The resulting signal passes through output amplifier 78 and is fed to digital-to-angalog converter 140 as signal 142 (shown in FIGURE 1(B)).

In order to obtain the relatively high bit rate signal, the relatively low bit rate signal must be removed from the multiplexed signal. This is accomplished in a manner very similar to that used to create a space in the digital multiplexer 106. The multiplexed signal 131 having a frequency $F_M$ enters the digital demultiplexer 132 at input 80 and is fed into AND gate 81. The multiplexed signal 131 having a frequency $F_M$ is also delayed one-half of a bit by delay line 82 and this delayed signal is fed into AND gate 83. The multiplexed signal 131 and the delayed multiplexed signal 131 are alternately gated into OR gate 84 by means of AND gates 81 and 83 and NOT gate 85, the gates being actuated by a signal from the frequency divider 53. Thus, a one value from the frequency divider 53 gates the delayed signal through the AND gate 83 and a zero value from the frequency divider 53 gates the incoming signal through AND gate 81. Variable delay line 86 acts upon the clock input 134 before it passes to the frequency divider 53 so that the signal 57 from the frequency divider 53 will have the proper relationship with the incoming signal 131. Schematic waveform diagrams of the incoming signal 131, both normal and delayed, along with the signal 57 from the frequency divider 53 and the output signal 87 from OR gate 84 are shown in FIGURES 5(A), 5(B), 5(C), and 5(D), respectively.

The output signal 87 of OR gate 84 is fed to reclocker 90. Reclocker 90 is driven by the signal 58 having a frequency $F_3$ equal to $F_M$ $$\left(1-\frac{1}{N}\right)$$

which is less than the bit rate of frequency $F_M$. Adjustable delay line 91 aligns the reclocking pulses in time so that they have the proper relationship with the output of OR gate 84 as shown in FIGURES 5(D) and 5(E).

Thus, since the reclocking frequency is less than the input frequency $F_M$, the several short bits will be periodically missed by the reclocker once in every span of N pulses. When properly aligned, the reclocking pulses will not sample the pulses representative of information in the second relatively low bit rate signal or the transitions between pulses. The resulting pulse train from the reclocker is coupled to an output amplifier 92 and the output 141 is fed to digit-to-analog converter 139 (shown in FIGURE 1(B)). This signal corresponds to the signal 100 which originated at the analog-to-digital converter 102.

The above description shows that the present invention provides a digital communication system which allows the transfer of information in a manner which assures secrecy of the information during transmission. In addition, the invention provides a simple and convenient means for multiplexing or interleaving in time the information contained on several digital signals. Furthermore, the invention provides a means to separate or demultiplex these two digital signals and to retime them so that they will appear in their original form. Moreover, the novel method and apparatus of the invention provide for the performance of this multiplexing and demultiplexing operation without the creation of error.

From the above description of the invention, it will be apparent that various modifications in the method and apparatus described in detail herein may be made. For example, the relative level of, as well as the relative difference between, the frequencies of the two digital signals could be within any practical limits. Also, it should be clearly understood that the synchronizing pattern described above was given primarily to illustrate one method of inserting a synchronizing pattern as well as one method for locating the pulses of the second signal so that they might be separated from the first signal. Therefore, the invention is not intended to be limited to the specific details of the apparatus described herein, except as may be required by thte following claims.

What I claim is:

1. A digital communication system comprising a first analog-to-digital converter for converting an analog signal having a high frequency into digital form, a second analog-to-digital converter for converting an analog signal having a low frequency relative to said high frequency into digital form, a digital multiplexer connected to the two analog-to-digital converters for receiving the digital output signals thereof, a clock pulse generator connected to the digital multiplexer for feeding a signal thereto having a fixed frequency, said digital multiplexer serving to produce two clock signals having frequencies the sum of which equals the fixed frequency of the signal from the clock pulse generator and which clock signals serve respectively to drive the analog-to-digital converters, the digital output signals of the analog-to-digital converters having respective bit rates equal to their respective frequencies and being fed into the digital multiplexer, the digital multiplexer producing a multiplexed signal having a frequency and bit rate which are equal to the respective sums of the frequencies and bit rates of the digital output signals of the two analog-to-digital converters, a transmitter connected to the digital multiplexer for receiving the multiplexed signal therefrom, a receiver for receiving the signal transmitted by the transmitter, a slicer connected to the receiver for distinguishing the amplitude of discrete pulses on the incoming multiplexed signal, a reclocker connected to the slicer for retiming and reshaping the pulses of the multiplexed digital signal fed thereto from the slicer, a digital demultiplexer connected to the reclocker and arranged to receive the reshaped and retimed multiplexed digital signal from the reclocker and to separate the two digital signals having said high and low bit rates and frequencies, a digital clock synchronizer also connected to the slicer for receiving the multiplexed digital signal therefrom and generating a clock signal having a frequency locked in phase with the multiplexed signal, which clock signal is fed to and drives both the reclocker and the digital demultiplexer, a first digital-to-analog converter connected to the digital demultiplexer for receiving therefrom the digital signal having said high frequency and reconverting the same to an output signal having its original analog form, and a second digital-to-analog converter connected to the digital demultiplexer for receiving therefrom the digital signal having said low frequency and reconverting the same to an output signal having its original analog form, each of said digital-to-analog converters being driven by its respective clock frequency which is generated and fed thereto by the digital demultiplexer.

2. A digital communication system comprising a first analog-to-digital converter for converting an analog signal having a high frequency into digital form, a second analog-to-digital converter for converting an analog signal having a low frequency relative to said high frequency into digital form, a digital multiplexer connected to the two analog-to-digital converters for receiving the digital output signals thereof, a clock pulse generator connected to the digital multiplexer for feeding a signal thereto having a fixed frequency, said digital multiplexer serving to produce two clock signals having frequencies the sum of which equals the fixed frequency of the signal from the clock pulse generator and which clock signals serve respectively to drive the analog-to-digital converters, the digital output signals of the analog-to-digital converters having respective bit rates equal to their respective frequencies and being fed into the digital multiplexer, the digital multiplexer producing a multiplexed signal having a frequency and bit rate which are equal to the respective sums of the frequencies and bit rates of the digital output signals of the two analog-to-digital converters, a digital processor for providing a coded multiplexed output signal, a transmitter connected to the digital multiplexer for receiving the multiplexed signal therefrom, a receiver for receiving the signal transmitted by the transmitter, a code converter connected to the receiver for clarifying the individual pulses on the incoming multiplexed signal, a digital demultiplexer connected to the code converter and arranged to receive the reshaped and retimed multiplexed digital signal from the code converter and to separate the two digital signals having said high and low bit rates and frequencies, a digital clock synchronizer also connected to the code converter for receiving the multiplexed digital signal therefrom and generating a clock signal having a frequency locked in phase with the multiplexed signal, which clock signal is fed to and drives both the code converter and digital demultiplexer, a first digital-to-analog converter connected to the digital demultiplexer for receiving therefrom the digital signal having said high frequency and reconverting the same to an output signal having its original analog form, and a second digital-to-analog converter connected to the digital demultiplexer for receiving therefrom the digital signal having said low frequency and reconverting the same to an output signal having its original analog form, each of said digital-to-analog converters being driven by its respective clock frequency which is generated and fed thereto by the digital demultiplexer.

3. A digital communication system comprising a first analog-to-digital converter for converting an analog signal having a high frequency into digital form, a reclocker connected to said first analog-to-digital converter for retiming and reshaping the digital output signal therefrom, a second analog-to-digital converter for converting an analog signal having a low frequency relative to said high frequency into digital form, a digital multiplexer connected to said reclocker and said second analog-to-digital converter for receiving the digital output signals thereof, a clock pulse generator connected to the digital multiplexer for feeding a signal thereto having a fixed frequency, said digital multiplexer serving to produce two clock signals having frequencies the sum of which equals the fixed frequency of the signal from the clock pulse generator and which clock signals serve respectively to drive the analog-to-digital converters and the reclocker, the digital output signals of the analog-to-digital converters having respective bit rates equal to their respective frequencies and being fed into the digital multiplexer, the digital multiplexer producing a multiplexed signal having a frequency and bit rate which are equal to the respective sums of the frequencies and bit rates of the digital output signals of the two analog-to-digital converters, a transmitter connected to the digital multiplexer for receiving the multiplexed signal therefrom, a receiver for receiving the signal transmitted by the transmitter, a slicer connected to the receiver for distinguishing the amplitude of discrete pulses on the incoming multiplexed signal, a reclocker connected to the slicer for retiming and reshaping the pulses of the multiplexed digital signal fed thereto from the slicer, a digital demultiplexer connected to the reclocker and arranged to receive the reshaped and retimed multiplexed digital signal from the reclocker and to separate the two digital signals having said high and low bit rates and frequencies, a digital clock synchronizer also connected to the slicer for receiving the multiplexed digital signal thereform and generating a clock signal having a frequency locked in phase with the multiplexed signal which clock signal is fed to and drives both the reclocker and the digital demultiplexer, a first digital-to-analog converter connected to the digital demultiplexer for receiving therefrom the digital signal having said high frequency and reconverting the same to an output signal having its original analog form, and a second digital-to-analog converter connected to the digital demultiplexer for receiving therefrom the digital signal having said low frequency and reconverting the same to an output signal having its original analog form, each of said digital-to-analog converters being driven by its respective clock frequency which is generated and fed thereto by the digital demultiplexer.

4. A digital multiplexing method which comprises periodically switching a first signal with said first signal with said first signal delayed one-half a bit to form an output signal having several relatively shorter bits along with a plurality of bits of normal length, one of which bits is redundant in that it duplicates information already shown by one of the relatively shorter bits over one cycle of the switching period, generating a series of spaced bits containing the information from a second signal, at least a portion of which bits constitutes a synchronizing pattern, inserting the bits from said second signal successively into the time spaces occupied by said redundant bits, and retiming the resulting signal to form a multiplexed output signal having bits of substantially uniform length.

5. A digital multiplexing method which comprises switching a first signal having a frequency $F_3$ with said first signal offset in time by one-half a bit at a switching rate equal to $F_M/N$ to form an output signal having several relatively shorter bits along with a plurality of bits of normal length, one of which normal bits is redundant over one cycle of the switching period in that it duplicates information already shown by one of the relatively shorter bits, generating a series of spaced bits containing the information from a second signal having a frequency $F_4$, inserting the bits from said second signal successively into the time spaces occupied by said redundant bits, and retiming the resulting signal to form a multiplexed output signal having bits of substantially uniform length and a frequency $F_M$ equal to $F_3$ plus $F_4$.

6. A digital demultiplexing method for separating the pulses of a first digital signal from the pulses of a second digital signal at least a portion of which pulses comprise a synchronizing pattern, which signals have been combined in a multiplexed digital signal characterized by the fact that pulses from said second digital signal occur at periodically spaced intervals on said multiplexed digital signal but are separated by a fixed number of pulses from said first digital signal, comprising individually sampling and examining selected pulses from said multiplexed digital signal to determine whether they constitute part of said synchronizing pattern, generating control pulses to advance the sampling process to a succeeding pulse until said synchronizing pattern is located, gating said second signal pulses from said multiplexed signal to obtain said second digital signal, switching said multiplexed signal with said multiplexed signal offset in time by one-half a pulse to form an output signal having several relatively shorter pulses along with a plurality of pulses of normal length, at least one of said shorter pulses during each switching cycle coming from said second digital signal, and sampling said output signal so as to sample only the pulses comprising said first signal to obtain said first digital signal.

7. A digital demultiplexing method for separating the pulses of a first digital signal having a frequency $F_3$ from the pulses of a second digital signal having a frequency $F_4$, at least a portion of which second signal pulses comprises a synchronizing pattern, which signals have been combined in a multiplexed signal characterized by the fact that pulses from the second digital signal occur at periodically spaced intervals on said multiplexed digital signal but are separated by a fixed number of pulses from said first digital signal, comprising individually sampling and examining selected pulses from said multiplexed digital signal to determine whether they constitute part of said synchronizing pattern, generating control pulses to advance the sampling process to a succeeding pulse until said synchronizing pattern is located, gating said second signal pulses from said multiplexed signal to obtain said second digital signal, switching said multiplexed signal with said multiplexed signal offset in time by one-half a pulse at a switching rate equal to $F_M/N$ to form an output signal having several relatively shorter pulses along with a plurality of pulses of normal length, at least one of said shorter pulses being from said second signal during each cycle of the switching period, and sampling said output signal at a frequency $F_3$ so as to sample only the pulses comprising said first signal.

8. A digital multiplexing and demultiplexing method which comprises periodically switching a first signal with said first signal delayed one-half a bit to form an output signal having several relatively shorter bits along with a plurality of bits of normal length, one of which bits is redundant in that it duplicates information already shown by one of the relatively shorter bits over one cycle of the switching period, generating a series of spaced bits containing the information from a second signal, at least a portion of which bits constitutes a synchronizing pattern, inserting the bits from said second signal successively into the time spaces occupied by said redundant bits, retiming the resulting signal to form a multiplexed output signal having bits of substantially uniform length, individually sampling and examining selected bits from said multiplexed digital signal to determine whether they constitute part of said synchronizing pattern, generating control pulses to advance the sampling process to a succeeding bit until said synchronizing pattern is located, gating said second signal bits from said synchronizing multiplexed signal to obtain said second digital signal, switching said multiplexed signal with said multiplexed signal offset in time by one-half of a bit to form an output signal having several relatively shorter bits along with a plurality of bits of normal length, at least one of said shorter bits during each switching cycle coming from said second digital signal, and sampling said output signal so as to sample only the bits comprising said first signal to obtain said first digital signal.

9. A digital multiplexing and demultiplexing method which comprises switching a first signal having a frequency $F_3$ with said first signal offset in time by one-half a bit at a switching rate equal to $F_M/N$ to form an output signal having several relatively shorter bits along with a plurality of bits of normal length, one of which normal bits is redundant over one cycle of the switching period in that it duplicates information already shown by one of the relatively shorter bits, generating a series of spaced bits containing the information from a second signal having a frequency $F_4$, inserting the bits from said second signal successively into the time spaces occupied by said redundant bits, retiming the resulting signal to form a multiplexed output signal having bits of substantially uniform length and a frequency $F_M$ equal to $F_3$ plus $F_4$, individually sampling and examining selected bits from said multiplexed digital signal to determine whether they constitute part of said synchronizing pattern, generating control pulses to advance the sampling process to a succeeding bit until said synchronizing pattern is located, gating said second signal bits from said multiplexed signal to obtain said second digital signal, switching said multiplexed signal with said multiplexed signal offset in time by one-half a bit at a switching rate equal to $F_M/N$ to form an output signal having several relatively shorter bits along with a plurality of bits of normal length, at least one of said shorter bits being from said second signal during each cycle of the switching period, and sampling said output signal at a frequency $F_3$ so as to sample only the bits comprising said first signal to obtain said first digital signal.

10. Apparatus for multiplexing and demultiplexing a first digital signal and a second digital signal, comprising means to create spaces periodically at spaced time intervals on said first signal, said spaces being separated by a plurality of pulses of said first signal, means to insert pulses from said second signal successively into said spaces, at least a portion of which pulses constitute a synchronizing pattern, to form a multiplexed digital signal containing both said first and second digital signals, retiming means to alter said multiplexed digital signal into a series of pulses of substantially equal perods for subsequent transmission or manipulation, means to individually sample and examine selected pulses from said multiplexed digital signal to determine whether they constitute part of said synchronizing pattern including means to generate control pulses to advance the sampling process to a succeeding pulse until said synchronizing pattern is located, means to gate the pulses comprising said second signal from said multiplexed signal to obtain said second digital signal, means to retime the pulses on said multiplexed signal so that the pulses comprising said second signal occupy a substantially smaller time interval than the other pulses, and means to sample said retimed multiplexed signal so as to sample only the pulses comprising said first signal to obtain said first digital signal.

References Cited

UNITED STATES PATENTS

| | | | |
|---|---|---|---|
| 2,984,706 | 5/1961 | Jamison | 178—50 |
| 3,065,302 | 11/1962 | Kaneko | 179—15 |
| 3,065,303 | 11/1962 | Kaneko | 179—15 |
| 3,067,291 | 12/1962 | Lewinter | 179—15 |
| 3,126,451 | 3/1964 | Scheftelowitz | 179—15 |
| 3,136,861 | 6/1964 | Mayo | 179—15 |

ROBERT L. GRIFFIN, *Primary Examiner.*

DAVID G. REDINBAUGH, JOHN W. CALDWELL, *Examiners.*

W. S. FROMMER, *Assistant Examiner.*